United States Patent [19]
Boyce et al.

[11] Patent Number: 5,262,114
[45] Date of Patent: Nov. 16, 1993

[54] METHOD OF MAKING AN INJECTION MOLDED GLASS GUIDANCE COMPONENT

[75] Inventors: Jay E. Boyce, Honeoye Falls; Michael J. Ferraro, Rochester, both of N.Y.

[73] Assignee: Schlegel Corporation, Rochester, N.Y.

[21] Appl. No.: 932,280

[22] Filed: Aug. 19, 1992

Related U.S. Application Data

[63] Continuation of Ser. No. 668,601, Mar. 13, 1991, abandoned.

[51] Int. Cl.⁵ .............................................. B29C 45/14
[52] U.S. Cl. ...................................... 264/257; 49/440; 264/259; 264/271.1
[58] Field of Search ............... 49/440, 441; 296/201, 296/202; 264/259, 257, 258, 271.1, 328.1

[56] References Cited

U.S. PATENT DOCUMENTS

| | | | |
|---|---|---|---|
| 2,060,656 | 11/1936 | Bailey | 49/440 |
| 2,336,835 | 12/1943 | Balfe | 428/591 |
| 2,503,887 | 4/1950 | Schlogel | 49/441 |
| 2,726,894 | 12/1955 | Bugbee | 49/441 |
| 2,758,871 | 8/1956 | Gray | 49/440 |
| 3,290,826 | 12/1966 | Weimar | 49/440 |
| 3,359,686 | 12/1967 | Kondolf | 49/441 |
| 3,401,075 | 9/1968 | Jackson | 49/441 |
| 3,604,153 | 9/1971 | Hess | 49/441 |
| 3,788,008 | 1/1974 | Yackiw et al. | 49/496 |
| 3,807,978 | 4/1974 | Niemanns | 49/441 |
| 4,314,872 | 2/1982 | Schiesser | 264/171 |
| 4,387,536 | 6/1983 | Prato | 49/502 |
| 4,648,207 | 3/1987 | Shibasaki | 49/441 |
| 4,894,289 | 1/1990 | Otawa et al. | 428/483 |

FOREIGN PATENT DOCUMENTS

| | | | |
|---|---|---|---|
| 129540 | 11/1946 | Australia | 49/440 |
| 464251 | 4/1950 | Canada | 49/440 |
| 0380385 | 8/1990 | European Pat. Off. | |
| 816384 | 8/1937 | France | 49/440 |
| 816310 | 7/1959 | United Kingdom | 49/441 |
| 922002 | 3/1963 | United Kingdom | 49/440 |
| 1113706 | 5/1968 | United Kingdom | |
| 1193737 | 6/1970 | United Kingdom | |
| 2186505 | 8/1987 | United Kingdom | |

*Primary Examiner*—Jay H. Woo
*Assistant Examiner*—Robert B. Davis
*Attorney, Agent, or Firm*—Cumpston & Shaw

[57] ABSTRACT

A glass guidance component having an injection molded thermoplastic chassis integrally bonded to a fabric interface during the molding process. The chassis is a thermoplastic polymer formed by injecting the thermoplastic into a mold in which the fabric interface is predisposed. During the injection and setting of the thermoplastic chassis, the fabric integrally bonds to the chassis. The fabric interface is disposed at locations which contact a glass panel and may include a pile material.

10 Claims, 2 Drawing Sheets

METHOD OF MAKING AN INJECTION MOLDED GLASS GUIDANCE COMPONENT

This is a continuation of copending application Ser. No. 07/668,601 filed on Mar. 13, 1991 now abandoned.

The present invention relates to glass guidance components, and more particularly, to a glass run channel having a thermoplastic chassis injection molded to a fabric interface.

DESCRIPTION OF THE RELATED ART

Glass guidance components provide a low friction path for guiding movable glass panels. Typically, glass guidance components include a U-shaped channel sized to receive a portion of the perimeter of the glass panel. To facilitate motion of the glass panel relative to the channel, the contact area between the channel and the panel includes a low friction strip. The low friction strip may include pile, flocking, felt, rubber, or thermoplastics. While each type of low friction strip provides certain advantages and disadvantages, pile is a preferred interface between the glass panel and the channel. Pile provides acoustic dampening and reduced friction, while providing an extremely abrasion resistant interface. Although the pile provides superior performance characteristics, affixing pile to the channel is a difficult and complicated process.

Efforts to employ pile have included the use of a metal channel which is crimped about a fabric backed pile. The metal channel is then bent to conform to the desired glass path. However, the use of metal channels adds to the weight of the vehicle, thereby decreasing the fuel efficiency. In addition, metal channels require substantial assembly processes which increase the cost of the component.

As the aerodynamics of cars have improved, the glass panels have become increasingly curvilinear. As the panels occupy and move through a plurality of radii, the demands on the glass guidance components increase. In many vehicles, molded thermoplastics have replaced metal channels in curvilinear guidance components. While thermoplastics allow for improved manufacturing techniques for the curvilinear configuration, a thermoplastic interface between the glass and the glass guidance component does not provide the abrasion resistant, low friction and acoustic dampening qualities of a pile interface.

In an effort to employ a pile interface with thermoplastic channels, adhesives have been used to attach a pile fabric to a preformed thermoplastic channel. While adhesives provide for the use of pile on curvilinear channels, the labor intensive adhesing process requires highly toxic and expensive chemicals, which require expensive control measures to prevent endangering the operators and the environment.

Alternative glass run channels have included rubber portions clamped to a metal channel. While the use of the rubber and metal glass guidance components has increased manufacturing efficiency, the quality and performance of the component has decreased. In addition, the use of rubber and metal requires extensive sub-assembly of preformed components, thereby increasing cost.

Therefore, a need exists for a glass guidance component having a fabric or pile interface which can accommodate curvilinear glass paths through a plurality of radii. The need exists for the manufacture and assembly of glass guidance components having a fabric interface which do not require extensive sub-assembly processes or chemicals. A need also exists for a glass guidance component which can be manufactured in any configuration to include a fabric interface, so as to accommodate the aerodynamic structure of the vehicle. A need also exists for a method of manufacturing glass guidance components having a fabric interface.

SUMMARY OF THE INVENTION

A glass guidance component having a thermoplastic chassis integrally molded to a fabric interface is disclosed. The thermoplastic chassis provides the structural rigidity of the component and the fabric interface provides the contact area with the glass panel. The chassis is injection molded with the fabric interface predisposed in the mold, so that the chassis and the fabric interface integrally bond during the formation of the chassis. The chassis is an injection molded thermoplastic polymer having the desired structural rigidity for the glass guidance component as either a permanent mount or a sub-assembly. Therefore, the glass guidance component may be formed to be directly mounted so as to orient the fabric interface in the desired location, or alternatively, the chassis and the fabric interface may form a sub-assembly, which can be mechanically or manually attached to an exisiting mount. The thermoplastic chassis of the present invention substantially reduces the weight of the glass guidance component, thereby improving the fuel efficiency of the vehicle. The fabric interface includes a woven fabric which integrally bonds to the chassis during the injection molding process. The fabric interface may include a pile for contacting the glass panel.

The method of manufacturing the glass guidance component includes disposing the fabric interface in the injection mold at predetermined locations; injecting the thermoplastic polymer to form the chassis; setting the thermoplastic in the mold at the necessary temperature and pressure, such that the thermoplastic bonds to the fabric interface without degrading the integrity of the fabric; and removing the integral glass guidance component from the mold.

DETAILED DESCRIPTION OF THE PREFERRED EMBODIMENT

Figure 1:
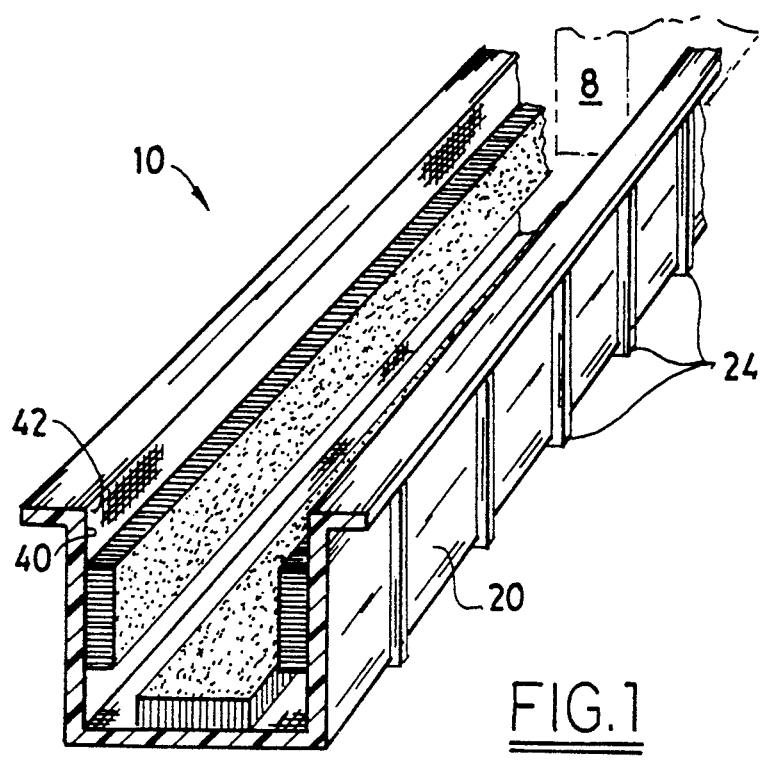
FIG. 1 is a perspective view of a length of the glass guidance component of the present invention.

Referring to FIG. 1, a glass guidance component 10 having a thermoplastic chassis 20 and a fabric interface 40 is disclosed. The fabric interface 40 is integrally bonded to the chassis 20 during formation of the chassis to form a unitary structure.

Figure 7:
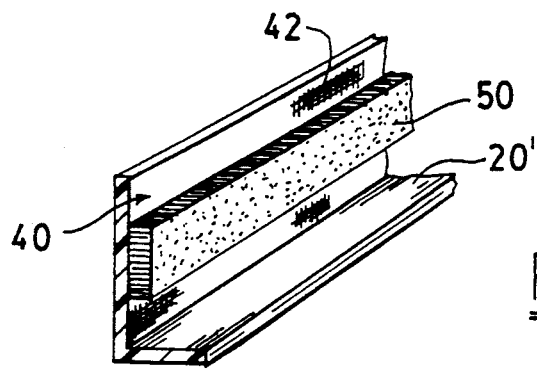
FIG. 7 is a perspective view of an alternative embodiment of a glass guidance component.
Figure 8:
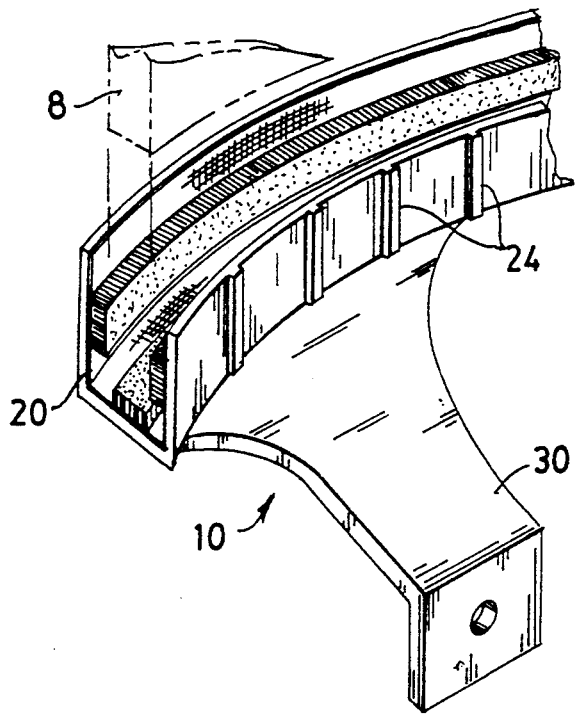
FIG. 8 is a perspective view of a glass guidance component having a mounting bracket for installation.

The chassis 20 may be any configuration as dictated by the design of the relevant glass panel 8. The chassis 20 may be formed to curve about a plurality of radii. In addition, the cross-section may vary as a chassis with a U-shaped cross-section as shown in FIGS. 1 and 8, an L-shaped cross section of the chassis 20' as shown in FIG. 7, or a flat cross-section or any combination thereof (not shown). The cross sectional area of the chassis 20 may vary throughout its length, thereby providing varying rigidity along the length of the component 10. As shown in FIGS. 1 and 8, the chassis 20 may be formed to include lateral, longitudinal or vertical reinforcing ribs 24, as dictated by design considerations.

Referring to FIG. 8, the chassis 20 may be formed to include mounting brackets or flanges 30 for direct mounting of the glass guidance component into its operating environment. Alternatively, the chassis 20 may be configured to provide a glass guidance component 10 sub-assembly for subsequent attachment to, or insertion into an existing component.

The preferred material for construction of the chassis 20 is dictated by the desired characteristics of the glass guidance component 10. Specifically, factors such as longitudinal stiffness, torsional stiffness, weight, cost, environmental temperature extremes and chassis configuration influence the selection of the material. Thermoplastics are a preferred material for construction of the chassis. While other polymers may be employed, typical thermoplastic polymers include polypropylene, polyethylene, ABS, nylon, or polycarbonate. Depending upon the intended use of the glass guidance component 10 and desired thermoplastic materials, the chassis 20 may be formed from a glass or carbon fiber filled thermoplastic resin, as is well known in the art.

Figure 2:
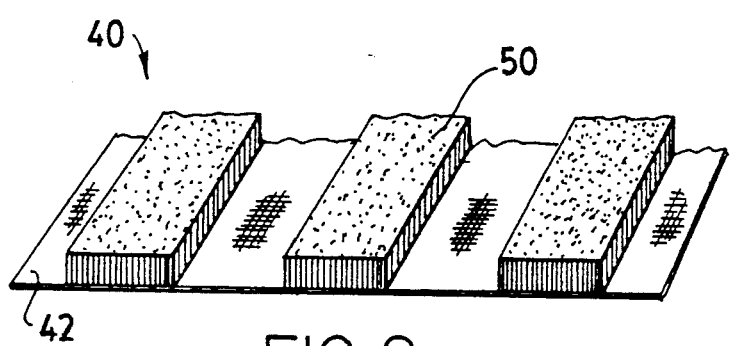
FIG. 2 is a partial perspective view of a fabric interface having pile portions.
Figure 3:
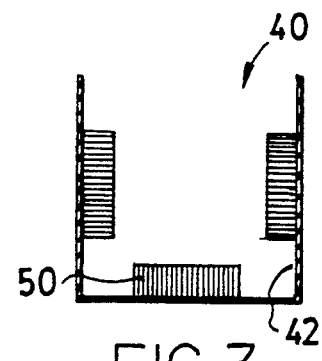
FIG. 3 is an end view of a fabric interface with pile configured for orientation within the mold.

As shown in FIGS. 1 and 2, the fabric interface 40 provides the contact area between the glass panel 8 and the chassis 20. The fabric interface 40 includes a woven fabric 42, which integrally bonds to the chassis during the formation of the chassis. The fabric interface 40 allows for relative motion between the glass panel 8 and the glass guidance component 10, while providing an abrasion resistant, low friction and sound dampening interface. The fabric interface 40 is a flat or face weave fabric formed from synthetic fiber yarns, such as polypropylene, polyester or nylon.

Figure 6:
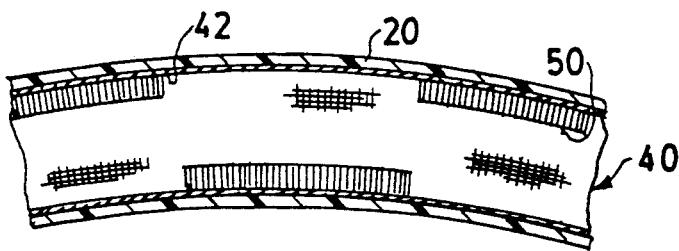
FIG. 6 is a top plan view of a glass guidance component having a fabric interface with pile located at predetermined positions.

As the fabric interface 40 is predisposed in the mold prior to the injection of the thermoplastic resin which forms the chassis 20, the fabric interface may be advantageously located only at the regions of contact along the length of the glass guidance component 10, as shown in FIG. 6. That is, the fabric interface 40 may be bonded to the chassis 20 along specific lengths of the component 10, or about specific portions on the cross-section of the component.

Depending upon the application of the glass guidance component 10, the fabric 42 alone may provide sufficient abrasive, acoustic and friction characteristics. However, the fabric interface 40 or portions of the interface may include a pile 50.

Referring to FIGS. 1–8, the bonding of the fabric 42 to the chassis 20 may be advantageously employed to provide a pile interface 50 for the glass guidance component 10. The use of a fabric interface 40 having pile 50 woven into the fabric 42 allows for the cost effective use of a pile interface in a curvilinear glass guidance component 10. The fabric 42 having the pile 50 on one side may be formed from any of the previously mentioned fabric materials. The specific pile material is determined by the desired glass guidance component characteristics such as abrasion resistance, crush resistance, coefficient of friction and chemical resistance. Although other materials may be used, the pile 50 may be formed from polyproylene, nylon, polyester or fluorocarbon yarn. The pile 50 on the fabric interface 40 may be disposed along any portion of the chassis 20. That is, the pile 50 may cover the entire fabric interface 40, or may be at select locations. Also, the pile 50 may be co-terminous with the edge of the chassis 20, or the pile may be set back from the edge of the chassis, as shown in FIG. 1.

As shown in FIG. 8, the chassis 20 may include the bracket 30 so that the glass guidance component 10 may be directly mounted in the operating environment. Alternatively, the glass guidance component 10 may be constructed for subsequently mounting in appropriate locations on existing channels or mounts. Therefore, once the chassis 20 is integrally molded with the fabric interface 40, the component 10 can be mounted as a complete assembly, or subsequently mounted as a subassembly.

METHOD OF MANUFACTURE

The glass guidance component 10 is formed as an integral unit in an injection molding process. A thermoplastic polymer is injection molded onto the fabric interface 40, to create a one-piece bonded structure.

The thermoplastic polymer forming the chassis 20 may be of any of the materials previously listed. Preferably, polyproylene is used to form the chassis 20. The fabric interface 40 may be any of the previously recited materials, as dictated by their ability to achieve the desired performance characteristics. The materials used for the fabric interface 40 are selected to exhibit strength and heat resistance to withstand the temperature and pressure of the injection molding process. It is advantageous to form the chassis 20 and the fabric interface 40 from compatible or like materials. Therefore, if the chassis 20 is formed of polypropylene, the preferred fabric interface 40 is formed of polypropylene yarn.

Although coatings may be used on the surface of the fabric interface 40 to increase the strength and integrity of the bond between the chassis 20 and the fabric interface, the glass guidance component 10 is formed without adhesives on the bonding surfaces of the fabric interface and the chassis. The use of coatings on the fabric interface 40 is a function of the loading and positioning of the fabric interface in the mold 56, as well as the configuration of the mold. Typical coatings include polypropylene, polyethylene, polyurethane, acrylics and latexes.

The glass guidance component 10 is formed in an injection mold. The mold 56 exhibits the desired curvilinear structure of the glass guidance component 10. The mold 56 may define a curvilinear path having a plurality of radii of curvature. In addition, the mold 56 may include portions having a U-shaped cross-section shown in FIG. 4, an L-shaped cross-section as shown in FIG. 7, a flat cross-section (not shown) or any cross-section dictated by the relevant application of the glass guidance component 10.

Figure 4:
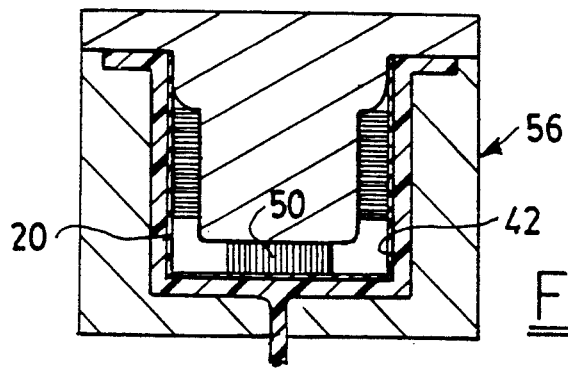
FIG. 4 is a cross-sectional view of an injection mold showing the fabric interface and the chassis.
Figure 5:
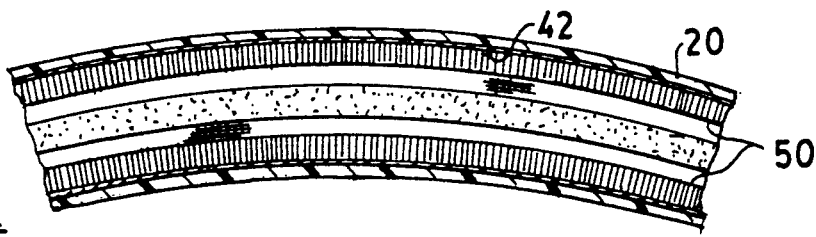
FIG. 5 is a top plan view of a glass guidance component having a fabric interface with pile disposed along the length of the component.

Prior to the injection of the thermoplastic polymer, the fabric interface 40 is disposed in the mold 56 at the predetermined locations. The fabric interface 40 may be set at various positions along the length of chassis 20 or the cross-section of the chassis. Referring to FIG. 4, when a pile 50 is employed, the pile is disposed so that the fabric 42 is between the pile and the thermoplastic, so that the fabric 42 is exposed to the injected thermoplastic.

The thermoplastic polymer is then injected into the mold 56. The mold 56, fabric interface 40 and thermoplastic polymer are then maintained at a sufficient temperature and pressure to set the chassis 20.

The temperature, pressure and cycle time in the mold 56 represents a balance between a sufficiently high temperature to ensure the complete filling of the mold with thermoplastic resin, and a low enough temperature to ensure the integrity of the fabric interface 40, and pile 50 (if employed). Although the specific temperature, pressure and cycle time varies from material to material, the typical injection temperature is between 250° to 550° F. If a plurality of entry points in the mold 56 are employed, the temperature must also be sufficiently high to ensure bonding at the knit points within the mold.

For the preferred glass guidance component 10 having a polypropylene chassis 20, a polypropylene fabric interface 40 with a nylon pile 50, a preferred pressure is 650 psi and temperature is 410° F., with a cycle time of approximately 15 seconds. The injection mold 56 may be employed with integral mold cooling as well known in the art.

As the thermoplastic is set by the temperature and pressure in the mold 56, the thermoplastic integrally bonds with the fabric interface 40 to provide an integral unit. The glass guidance component 10 is formed by bonding during fabrication, rather than a subsequent bonding. Therefore, the present invention is formed in a single process, as opposed to the subsequent bonding of a pre-formed chassis to a fabric interface.

The type of bond created between the chassis 20 and the fabric interface 40 during formation of the chassis depends upon the materials of the chassis and fabric interface. If the chassis 20 and fabric interface 40 are like materials, such as polypropylene and polypropylene, then the bond is a substantially chemical type bond. If the chassis 20 and the fabric interface 40 are unlike, or dissimilar materials, such as a polypropylene chassis and a nylon fabric interface, then the bond is a mechanical bond. Alternatively, if the fabric interface 40 is polypropylene coated with a water base latex and the chassis 20 is polyethylene, then the bond is an adhesive type chemical bond. These bonds are formed during the injection molding of the chassis 20 with the fabric interface 40 predisposed in the mold 56.

As the glass guidance component 10 may extend over a length of travel of the glass panel, it is often desirable to have the chassis 20 exhibit differing structural rigidities throughout its length. As shown in FIG. 8, the injection molding of the glass guidance component 10 permits the chassis 20 to include variations in thickness, reinforcing ribs 24, or attachment brackets 30 to form the complete component in a single process. Alternatively, the chassis 20 may be substantially affixed to steel, aluminum, or plastic mounts by rivets, staples, screws, ultrasonic welding or friction fits.

Although the present invention has been described in terms of particular embodiments, it is not limited to these embodiments. Alternative embodiments and modifications, which would still be encompassed by the invention, can be made by those skilled in the art, particularly in light of the foregoing teachings. Alternative embodiments, modifications or equivalents, may be included within the spirit and scope of this invention, as defined by the claims.

What is claimed is:

1. A method of manufacturing a glass guidance component, comprising:
   (a) disposing a fabric interface at predetermined locations in an injection mold cavity;
   (b) injecting a thermoplastic into the mold cavity, so that the thermoplastic contacts the fabric interface; and
   (c) substantially setting the thermoplastic in the mold cavity.

2. The method of claim 1, further comprising the step of maintaining a sufficient temperature and pressure in the mold cavity to bond the fabric interface to the thermoplastic and substantially preclude deformation of the fabric interface.

3. The method of claim 1, further comprising disposing a fabric interface having a pile surface in the mold so that the pile is intermediate the fabric interface and the thermoplastic.

4. A method of manufacturing an injection molded guidance component for guiding a panel during relative movement between the guidance component and the panel, the guidance component having a sliding interface at a predetermined location for contacting the panel, comprising:
   (a) disposing the sliding interface in substantially the predetermined location in an injection mold cavity;
   (b) introducing a settable plastic into the mold cavity, so that the plastic contacts the sliding interface; and
   (c) sufficiently setting the plastic to permit removal of the molded guidance component from the mold cavity.

5. The method of claim 4, further comprising maintaining a sufficient temperature and pressure in the mold to substantially bond the sliding interface to the plastic and substantially preclude degradation of the sliding interface.

6. A method of manufacturing a glass guidance component, comprising:
   (a) disposing a coated fabric interface in at a least one predetermined location in an injection mold cavity;
   (b) introducing a plastic into the mold cavity, so that the plastic contacts the fabric interface; and
   (c) sufficiently curing the plastic in the mold cavity to permit removal of the glass guidance component from the mold cavity.

7. The method of claim 6, further comprising maintaining a sufficient temperature and pressure in the mold to substantially bond the interface to the plastic and substantially preclude degradation of the interface.

8. A method of manufacturing a glass guidance component, comprising:
   (a) disposing a pile interface in at least one predetermined location in an injection mold cavity;
   (b) introducing a settable plastic into the mold cavity; and
   (c) sufficiently setting the plastic in the mold cavity to permit removal of the glass guidance component from the mold cavity.

9. The method of claim 8, further comprising maintaining a sufficient temperature and pressure in the mold to substantially bond the interface to the plastic and substantially preclude degradation of the pile.

10. A method of manufacturing an integral glass guidance component for guiding a glass panel, comprising:
   (a) locating a fabric interface at predetermined glass contacting locations in an injection mold cavity;
   (b) introducing a thermoplastic into the mold cavity, so that the thermoplastic contacts a portion of the fabric interface; and
   (c) substantially setting the thermoplastic in the mold cavity to form an integral glass guidance component having the fabric interface at predetermined glass contacting locations.

* * * * *